(12) United States Patent
Voigt et al.

(10) Patent No.: US 8,005,014 B2
(45) Date of Patent: Aug. 23, 2011

(54) METHOD OF CHOOSING NODES IN A MULTI-NETWORK

(75) Inventors: Douglas L. Voigt, Boise, ID (US); Douglas Hagerman, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 11/796,419

(22) Filed: Apr. 27, 2007

(65) Prior Publication Data

US 2008/0267071 A1    Oct. 30, 2008

(51) Int. Cl.
*H04L 12/24* (2006.01)
(52) U.S. Cl. .................. 370/254; 370/401; 709/221
(58) Field of Classification Search .......... 370/252, 370/254, 255, 400, 401; 709/220, 221
See application file for complete search history.

(56) References Cited

U.S. PATENT DOCUMENTS

| | | | |
|---|---|---|---|
| 7,577,091 B2* | 8/2009 | Antal et al. | 370/229 |
| 2002/0036988 A1* | 3/2002 | Cardwell et al. | 370/238 |
| 2003/0076831 A1* | 4/2003 | Van Doren et al. | 370/394 |
| 2003/0212734 A1* | 11/2003 | Stewart | 709/201 |
| 2005/0201302 A1* | 9/2005 | Gaddis et al. | 370/254 |
| 2005/0228879 A1* | 10/2005 | Cherkasova et al. | 709/224 |
| 2005/0278439 A1* | 12/2005 | Cherkasova | 709/223 |
| 2006/0026599 A1* | 2/2006 | Herington et al. | 718/105 |
| 2007/0050485 A1* | 3/2007 | Zolfaghari | 709/220 |
| 2007/0185990 A1* | 8/2007 | Ono et al. | 709/224 |
| 2007/0211637 A1* | 9/2007 | Mitchell | 370/238 |
| 2007/0233872 A1* | 10/2007 | Yoshikawa et al. | 709/226 |

* cited by examiner

*Primary Examiner* — Pankaj Kumar
*Assistant Examiner* — Duc T Duong

(57) ABSTRACT

Embodiments include methods, apparatus, and systems for choosing nodes in a multi-network. One embodiment includes a method that receives demand characteristics for nodes to form a cluster in multi-network and collapses groups of nodes in the multi-network to form a node group. The method then selects nodes that satisfy the demand characteristics in order to form the cluster.

20 Claims, 4 Drawing Sheets

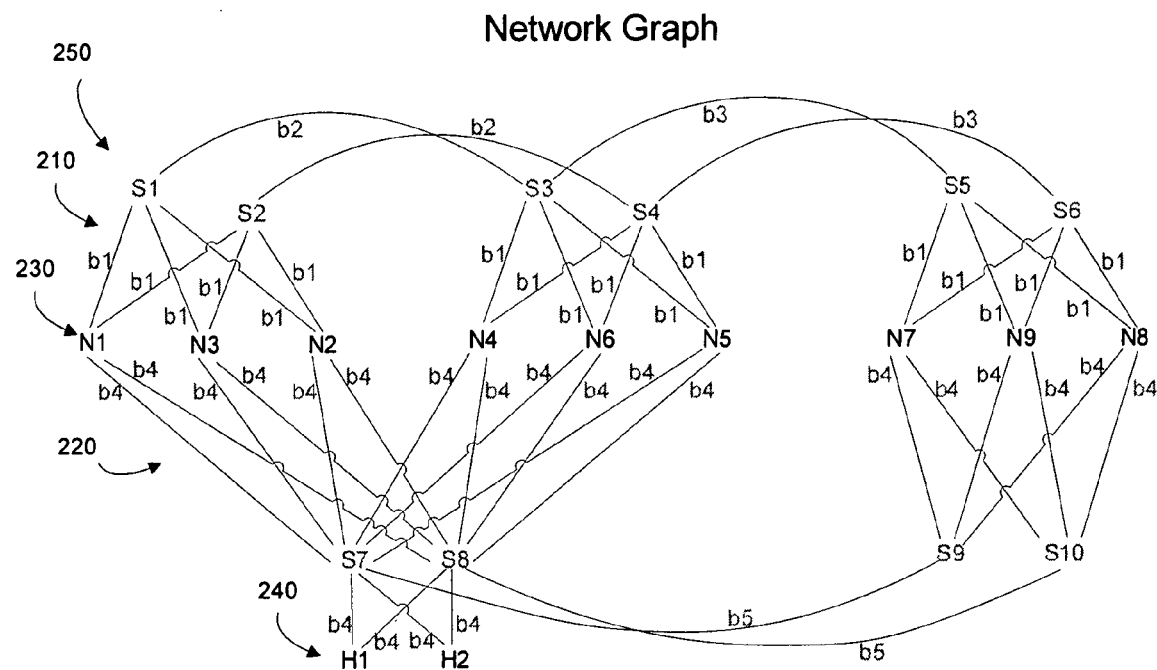
FIG. 2B
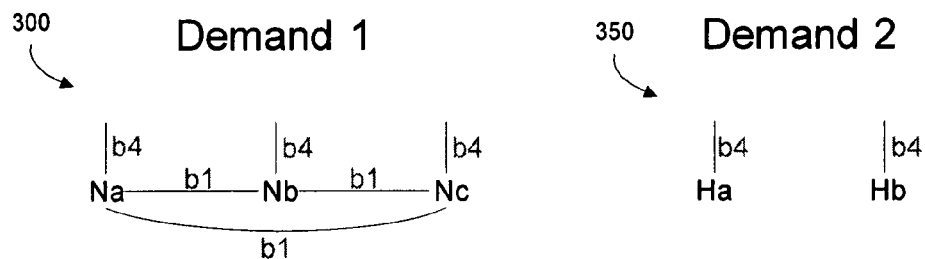
FIG. 3A  FIG. 3B

METHOD OF CHOOSING NODES IN A MULTI-NETWORK

BACKGROUND

More and more products are being implemented as clusters which in many cases exist in a larger multi-network context. For example, clusters of computers running applications are interconnected using Ethernet and communicate with storage arrays using Fiber Channel. In some cases, the arrays themselves are clusters that are interconnected by a private network.

The advent of the Adaptive Enterprise in technical and commercial computing and the StorageWorks Grid in storage significantly increases the flexibility customers have when configuring new applications and the associated storage. This flexibility in turn creates a need for tools to guide the placement of both data and functionality across nodes in multi-network clusters. Heretofore this task was performed manually or in highly constrained patterns.

BRIEF DESCRIPTION OF THE DRAWINGS

FIG. 2B is another diagram of a network system with plural nodes in accordance with an exemplary embodiment of the present invention.

FIG. 3A is a diagram showing demand with a three node storage cluster in accordance with an exemplary embodiment of the present invention.

FIG. 3B is a diagram showing demand of a host cluster in accordance with an exemplary embodiment of the present invention.

DETAILED DESCRIPTION

Embodiments are directed to apparatus, systems, and methods to choose nodes in a multi-network system having multiple connection bandwidths. One embodiment uses node grouping techniques to place new clusters or data groupings onto networked compute nodes or controllers (such as controllers used in disk arrays). Inputs include descriptions of the desired clusters, existing nodes, and their interconnections. A single set of nodes can participate in multiple networks. The description of the desired outcome generally includes multiple interconnected clusters.

Figure 1:
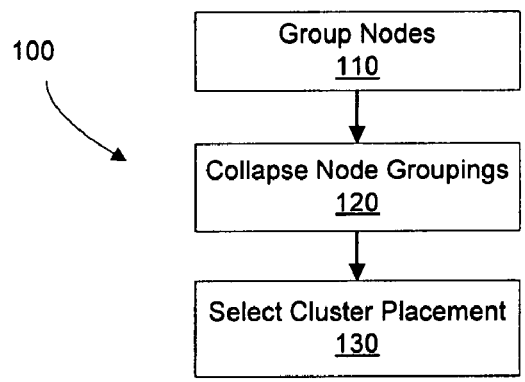
FIG. 1 is a flow diagram for choosing nodes in a multi-network system in accordance with an exemplary embodiment of the present invention.

FIG. 1 is a flow diagram 100 for choosing nodes in a multi-network system in accordance with an exemplary embodiment of the present invention.

According to block 110, nodes are grouped together. In one embodiment, nodes are grouped according to connectivity and interconnect performance. The groups are then filtered based on cluster needs.

According to block 120, the node groupings are collapsed. In one embodiment, node groupings associated with different networks are collapsed into one set of node groups and filtered again based on cluster needs. This pattern of successive group pruning significantly reduces the computational complexity of placement decisions compared with conventional optimization techniques.

According to block 130, a multi-cluster placement is selected. In one embodiment, node utilization criteria are applied to select a multi-cluster placement from the remaining permutations.

One exemplary embodiment chooses which data storage nodes to use for virtual volumes in a distributed disk array when the inter-node bandwidth is not uniform within the array. Performing this selection is a bin packing problem with many degrees of freedom and may require significant compute power to solve. The first insight that leads to simplification of this problem is that many productized clusters are placed in groups of nodes (computers or controllers) that have high, relatively symmetric network connectivity and performance. These groups tend to be networked to each other with lower connectivity and performance. If the highly interconnected nodes are treated as a group rather than individually, then the placement problem is simplified.

A second insight that leads to further simplification of this problem is that of beginning with a fairly explicit statement of the desired cluster and node characteristics, referred to herein as "demand." Characteristics of the demanded clusters are used to prune candidate nodes and groups of nodes as early as possible in the placement decision process. Demand characteristics also include interconnection between clusters. In one embodiment, this forms the basis for collapsing multiple networks into a single set of node groups for each cluster demanded.

As a third insight, the application of utilization metrics as another selection criteria allows the solution space that remains after grouping and filtering to be truncated when adequately balanced solutions are identified. Exemplary utilization criteria include, but are not limited to, utilization caps (example, no resource should be more than 80% utilized) and utilization balance (example, resource utilization on each node should be within 10% of the average across the nodes). These criteria can be applied to various resources depending on demand and the sophistication of the underlying utilization models, with processor, disk and network utilizations being common in one embodiment.

Figure 2A:
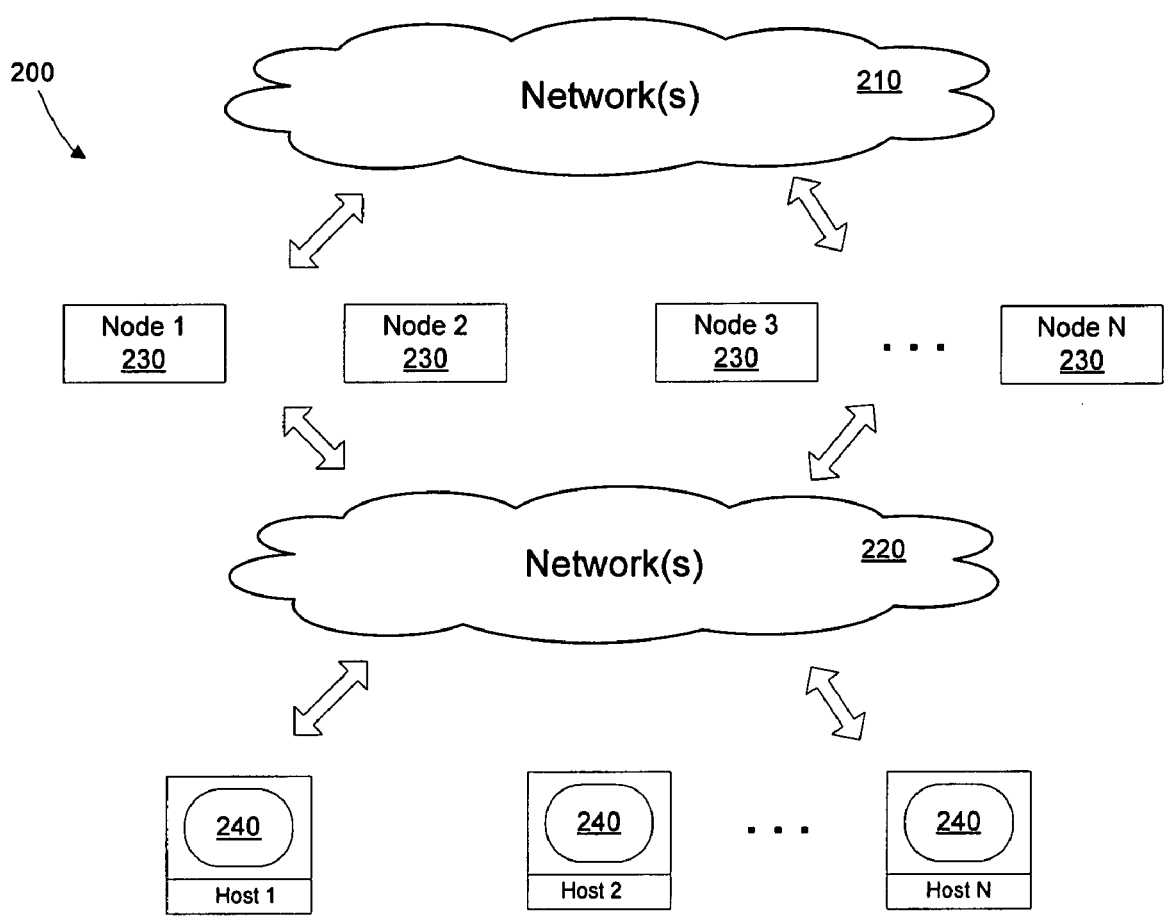
FIG. 2A is a diagram of a network system with plural nodes in accordance with an exemplary embodiment of the present invention.

FIG. 2A is a block diagram of a network system 200 with plural nodes and networks in accordance with an exemplary embodiment of the present invention. The network system includes plural networks 210, 220, a plurality of nodes 230 (shown as node 1 to node N), and a plurality of hosts 240 (shown as host 1 to host N). The hosts 240 communicate with the nodes through network 220. By way of example, network 220 is a storage area network (SAN) using fibre channel (FC). The nodes 230 communicate and are connected together through the network 210, such as an SAS (serial attach SCSI, small computer system interface).

Nodes are electronic computing devices such as servers using a central processing unit (CPU) or controller using storage (such as an array). For instance, one or more of the nodes is a storage device that forms part of a clustered array storage architecture in which multiple individual array storage systems are configured from a pool of shared resources that are accessible on a common network. The shared resources include disks, disk shelves, and network infrastructure components. Each individual array comprises one or more array controllers and a subset of the shared resources. The cluster architecture provides the ability to move access to the shared resources between arrays to provide performance and capacity scaling, load balancing, data movement, and other useful features.

For instance, the hosts 240 communicate with an array controller 230 using a small computer system interface (SCSI) or other interface/commands over a fiber channel (FC). By way of example, networks 210 and 220 include one or more of the Ethernet, fibre channel (FC), serial attached SCSI (SAS), iSCSI, internet, local area network (LAN), wide area network (WAN), public and/or private networks, etc.

In one exemplary embodiment, a node is an array controller that includes network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 104 and disk arrays 106 are memory nodes that include one or more servers.

If a node 230 includes an array controller, then it manages various data storage and retrieval operations. For instance, the array controller receives I/O requests or commands from the host computers 240 (such as data read requests, data write requests, maintenance requests, etc.) and manages the storage and retrieval of data on the multiple disk arrays and disk groups.

FIG. 2B is another diagram of a network system 250 with plural nodes in accordance with an exemplary embodiment of the present invention. In one embodiment, FIG. 2B presents a different view of the FIG. 2A but still includes hosts 240 and nodes 230 communicating through plural networks 210, 220.

For discussion purposes, nodes 230 are used to build storage clusters in this figure (nodes being shown with the letter "N"). These nodes are interconnected with networks 210 and 220. The network 210 is referred to as the blue network, and the network 220 is referred to as the red network. In one embodiment, the blue network illustrates a cluster interconnect as might occur in a storage cluster that forms an array or NAS (network attached storage) solution. The red network illustrates connection with a client host cluster (hosts being shown with the letter "H"). Note that additional networks and node types (such as storage nodes separate from storage controller nodes) can be incorporated into the model of FIG. 2B. Each network includes a plurality of switches (shown with the letter "S"). The arcs in the figure illustrate connectivity with bandwidth indications (shown with the letter "b"). Other interconnect characteristics such as I/Os per second can be added to the model as well.

FIG. 2B shows nine cluster nodes (labeled N1, N2, ... N9), ten switches (labeled S1, S2, ... S10), and two host nodes (labeled H1 and H2). These devices communicate through five bandwidth indications (labeled b1, b2, ... b5).

FIG. 2B shows many links with the same bandwidth, illustrating the motivation for the first simplification discussed above. For further illustration, it is assumed that the bandwidths are numbered in decreasing order (in other words b1>b2>b3>b4>b5). Node characteristics other than network connectivity can be incorporated into the model. For purposes of illustration, one embodiment uses disk storage capacity as a node characteristic by assuming the following:

(1) Nodes N1, N2, N3, N7, N8 and N9 have at least 1 Tby of disk capacity available.
(2) Nodes N4, N5 and N6 have less than 1 Tby of disk capacity available.

FIGS. 3A and 3B provide exemplary descriptions of demand. FIG. 3A is a diagram showing demand 300 with a three node storage cluster. FIG. 3B is a diagram showing demand 350 of a host cluster.

FIG. 3A (labeled as Demand 1) shows a three node storage cluster with inter-node bandwidth b1 and per-node SAN connectivity with bandwidth b4. For illustration, it is assumed that demand 1 stipulates 1 Tby of disk capacity per node, and full network redundancy. FIG. 3B (labeled as Demand 2) illustrates a host cluster that accesses the cluster of demand 1 via the SAN with bandwidth b4. While the example indicates specific networks for each purpose, selection could also be based on network type as will be illustrated in the process below. For illustration, it is assumed that demand 2 specifies redundant SAN connectivity.

The nodes (Na, Nb, Nc) and hosts (Ha, Hb) in the demand FIGS. 3A and 3B use letter subscripts to indicate that the actual nodes and hosts have not yet been selected. In one embodiment these place holders describe the demands of the cluster prior to node and host selection. In another embodiment specific hosts or nodes could be identified for a subset of the cluster if they are known in advance.

The statements of demands 1 and 2 provide sufficient specificity to significantly narrow placement choices. This is viewed as reasonable in that the demand is generally associated with a known application whose approximate workload and resource consumption can be predicted. Although networks and/or network types are shown as distinct, this same technique can be applied to single network grids. While single network grids eliminate the need to collapse networks they also increase the computation required for the final (solution selection) step in the process described below.

For discussion purposes, exemplary embodiments are discussed as operating on the following data structures:

Node: Array of node descriptions. Each contains a set of single node characteristics such as disk capacity. Other characteristics can be added depending on the sophistication of the demand model. Each node also contains a list of physical connections to switches and possibly logical connections to other nodes, including characteristics like bandwidth associated with each. Switches may also be represented as nodes in this array.

GroupedNet: Array of groups of networked nodes wherein sets of groups have similar interconnect bandwidth. Each node reference is accessed in this structure using four indices. Note that any node can appear in multiple groups. The indices have the following significance:

p—physical network supporting a group,
b—minimum bandwidth category of interconnect, assumed to be uniform,
g—enumeration of groups that meet or exceed minimum bandwidth, and
n—enumeration of nodes in the group.

Demand: Array of cluster demand descriptions. Each element of this array includes a set of characteristics uniformly demanded of every node in a cluster as well as a node count. Each also includes an indication of the bandwidth and characteristics needed from each network or network type impinging on the nodes in the cluster. In addition each demand includes candidate node and node group workspaces in which to conduct demand driven filtering. Besides a list of the nodes that meet the criteria demanded from every node in the cluster the workspace includes a per-network list of groups that meet the cluster's interconnect demand placed on that network. Finally there is a list of collapsed node groups to retain the result of the collapsing of multiple network groups.

Solution: Array of solutions, each of which indicates a specific placement of all demanded clusters in respective node groups. For each demand, each solution references a collapsed node group recorded in the demand workspace. Each solution also captures utilization metrics or other final selection criteria accumulated late in the process. Once the eligible placements of each cluster demand have been recorded in the demand workspace, this structure is used to evaluate the placement of multiple demand clusters relative to each other.

Figure 4:
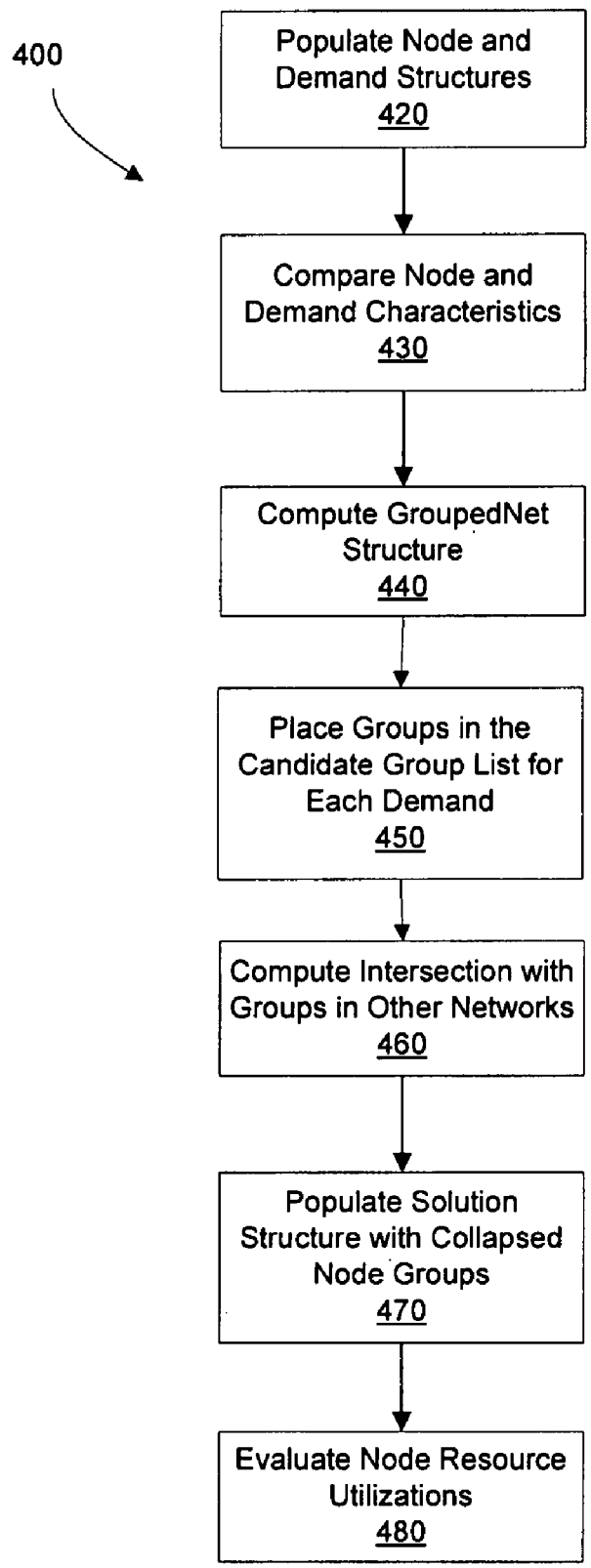
FIG. 4 is a flow diagram for placing demand clusters in node groups in accordance with an exemplary embodiment of the present invention.

Exemplary embodiments operate on these structures to place demand clusters in node groups. FIG. 4 is a flow diagram 400 for placing demand clusters in node groups in accordance with an exemplary embodiment of the present invention.

According to block 420, the node and demand structures are populated. In other words, populate the node structure as well as a portion of the demand structure as inputs to the decision algorithm. The portions of the demand structure that are not populated during this step are the candidate nodes and node groups. These structures are inputs to the decision process. In the example of the illustration the result of this step is an encoding of the information contained in the figures earlier in this document and the accompanying text.

According to block 430, compare node and demand characteristics. In other words, compare the single node characteristics of each node with the characteristics of each demand. If the node exhibits all of the necessary characteristics of any demand then add it to the candidate node list for that demand. In the example being illustrated, this process results in the elimination of nodes N4, N5 and N6 from further consideration in demand 1 as they have insufficient disk capacity.

According to block 440, compute GroupedNet structure. In other words, compute the GroupedNet structure from information in the node structure using bandwidth grouping criteria derived from the bandwidths interconnecting various nodes (230), hosts (240), and switches (250). To do so, convert each unique bandwidth incident on a node, host, or switch into a bandwidth threshold for grouping purposes. Visit each network node that appears in any demand's candidate node list to find the set of nodes connected to it with at least the bandwidth described by each threshold. Create a group in the GroupedNet structure under the appropriate network and bandwidth level for each subset of the set of nodes that is fully connected with the necessary bandwidth and is not already in the list of groups. Exclude groups that are subsets of groups already listed for the same network and threshold.

The result of the compute the GroupedNet structure step is shown in the table below, encoded in the GroupedNet data structure.

TABLE 1

| Network Type | Threshold | Group | Nodes |
|---|---|---|---|
| Blue | b1 | 1 | N1, N2, N3 |
| Blue | b1 | 2 | N7, N8, N9 |
| Blue | b3 | 1 | N1, N2, N3, N7, N8, N9 |
| Red | b4 | 1 | H1, H2, N1, N2, N3 |
| Red | b5 | 1 | H1, H2, N1, N2, N3, N7, N8, N9 |

This table illustrates a number of points:
1) Nodes N4, N5 and N6 are not included because they were eliminated in block 430.
2) All Nodes that are candidates for any demand are treated the same way during block 440.
3) Each network includes a group with bandwidths lower than the threshold expressed by any cluster demand.
4) The groups are cumulative as thresholds decrease.
5) All nodes appear in multiple groups due to the handling of multiple networks and thresholds in the grouping.
6) Network types as opposed to specific networks are listed in this table. Physically separate networks will result in separate groups within network types. Network specificity can be added by requiring that candidate groups contain specific switch nodes.

According to block 450, place the groups in the candidate group list for each demand. In other words, for each group in the GroupedNet structure that matches the network type and characteristics of a cluster demand, place the group in the candidate group list for that demand. It is legitimate for a subset of nodes in the group to meet the requirements of the demand. In these cases it is the original group that is tracked. This aspect of one embodiment captures inter-cluster connectivity necessary to form multi-cluster solutions. The subset that met the requirements is not tracked at this point so as to avoid enumerating all subsets available for placing a small cluster in a large node group at this point in the process. Note that the demand may refer to specific networks (as opposed to network types) and/or specific nodes that must appear in the cluster. In these cases groups that do not contain the necessary specific elements are omitted.

The result of block 450 is represented in the candidate node group sub-structure for each demand as illustrated in the following table.

TABLE 2

| | | | Group reference in GroupedNet | |
|---|---|---|---|---|
| Demand | Network Type | Candidate Node Group | Network Type | Threshold | Group |
| 1 | Blue | 1 | Blue | b1 | 1 |
| 1 | Blue | 2 | Blue | b1 | 2 |
| 1 | Red | 1 | Red | b4 | 1 |
| 2 | Red | 1 | Red | b4 | 1 |

According to block 460, compute the intersection with groups in other networks. In other words, for each group in each cluster demand, compute the intersection of the group with groups in the other networks referenced by the cluster demand. For each intersection of one group from each network that meets the cluster demand criteria, add the group to the collapsed node group list in that demand's candidate structure. An exemplary criterion that should to be met is node count, although there are several ways that the criteria may apply. One way is to insist that sufficient nodes in the intersection connect to all networks. In this case nodes that are not in the intersection are omitted from the collapsed node group list. Another way that may meet the needs of some types of clusters is to designate one network as the cluster interconnect (as opposed to host, disk or other interconnect) and to insist that the intersection of the cluster interconnect group with each other network group contain the minimum node count. If so then the cluster interconnect group is included in its entirety. The choice between these methods of applying node count criteria is designated as an input characteristic of each demand cluster.

The result of this process in the example is one node group per demand as shown below.

TABLE 3

| Demand | Candidate Node Group | Group reference in GroupedNet | | |
| --- | --- | --- | --- | --- |
| | | Network Type | Threshold | Group |
| 1 | 1 | Blue | b1 | 1 |
| 2 | 1 | Red | b4 | 1 |

There is no longer network specificity to the grouping. The second row from table 2 was eliminated because the group N7, N8, N9 does not have enough connectivity to the blue network. The third row served to validate inclusion of the first row in the collapsed list, and so it is not listed separately. The last row is retained because demand 2 only references one network.

According to block 470, populate the solution structure with collapsed node groups. In other words, populate the solution structure with collapsed node groups such that each solution references one collapsed node group for each demand and all permutations are represented. Exclude permutations that lack mutual access to the same physical network to the level needed by the demands. This is to represent that fact that access to the same network type is not sufficient; it should be the same physical network.

The result of block 470 is only one solution, consisting of the 2 node groups from table 3.

According to block 480, evaluate node resource utilizations. In other words, evaluate the node resource utilizations resulting from each solution. Relevant resources include per-node characteristics like disk capacity and network resources like bandwidth. Eliminate solutions that do not meet utilization criteria (e.g. one or more resources over 80% utilized). Rank solutions according to the balance of resource utilization across nodes. Balanced utilization of different resources can be prioritized or weighted. Recommend solutions that yield the most nearly balanced utilization.

Block 480 becomes complicated if small clusters are being placed in large groups. The permutations of utilization to evaluate here can be limited by placing the node count indicated by each demand in least heavily utilized nodes of the groups indicated in the solution.

The evaluation of solutions does not have to yield a clear winner to be useful, as long as at least one solution meets minimal criteria. If many solutions produce the same metrics then they can ordered arbitrarily, or according to additional criteria such as minimum storage cost or best fit. One embodiment allows a storage administrator to examine the recommended result for modification or confirmation. In cases where no solution was found or if many solutions have the same result, the administrator has the option of choosing based on their own criteria or modifying the cluster demand. Exemplary embodiments can also be placed within a larger decision process that iterates on ways of describing demand clusters, all of which meet application needs.

While the description of exemplary embodiments is generalized to cluster placement it can be used to place data in a clustered system as well. This is done by creating a demand that reflects the node count, performance and capacity needs of the volume. The node list created above is constrained to contain only the nodes within the existing cluster(s) that could contain the volume. After completing the decision algorithm the volume is deployed across an appropriate subset of the nodes in the group recommended by the algorithm.

Figure 5:
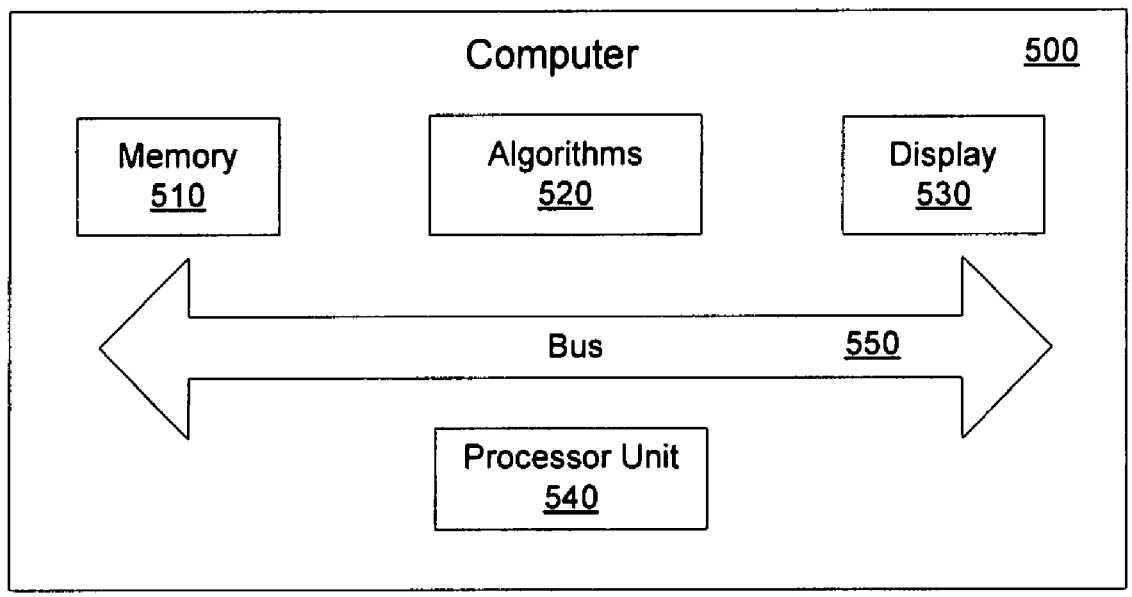
FIG. 5 is a block diagram of a computer in accordance with an exemplary embodiment of the present invention.

FIG. 5 is a block diagram of a server or computer 500 in accordance with an exemplary embodiment of the present invention. In one embodiment, the computer includes memory 510, one or more algorithms 520 (example, algorithms for implementing one or more aspects of exemplary embodiments), display 530, processing unit 540 and one or more buses 550.

In one embodiment, the processor unit includes a processor (such as a central processing unit, CPU, microprocessor, application-specific integrated circuit (ASIC), etc.) for controlling the overall operation of memory 510 (such as random access memory (RAM) for temporary data storage, read only memory (ROM) for permanent data storage, and firmware). The memory 510, for example, stores applications, data, programs, algorithms (including software to implement or assist in implementing embodiments in accordance with the present invention) and other data. The processing unit 540 communicates with memory 510 and display 530 via one or more buses 550.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
receiving characteristics that describe demands for a new cluster of nodes to be formed in a multi-network system;
grouping, by the computer, nodes in the multi-network system to form node groups associated with different networks of the multi-network system;
comparing, by the computer, characteristics of each node in the node groups with the characteristics that describe the demand for the new cluster of nodes;
eliminating, by the computer and based on the comparing, some of the node groups;
selecting, by the computer, a portion of the nodes not eliminated to form the new cluster in the multi-network system.

2. The method of claim 1, wherein the nodes are grouped to form the node groups based on connectivity and interconnect performance of the nodes in the multi-network system.

3. The method of claim 1 further comprising, receiving input that describes the demands of the new cluster.

4. The method of claim 1 further comprising, selecting, based on a bin packing problem, the portion of nodes for use as virtual volumes in a distributed disk array when bandwidth is not uniform within the distributed disk array.

5. The method of claim 1 further comprising, placing the new cluster onto a group of networked computer nodes or controllers that have symmetric network connectivity and performance.

6. The method of claim 1, further comprising:
filtering the node groups based on performance characteristics of the new cluster.

7. A non-transitory physical storage media storing instructions for causing a computer to execute a method, comprising:
receiving a description of characteristics requested for nodes to form a cluster in a multiple network system;
eliminating nodes from the cluster by collapsing groups of nodes in the multiple network system to form a node group;
comparing characteristics of each node in the node group with the characteristics requested for the nodes to form the cluster;
selecting, based on the comparing, nodes in the node group that satisfy the description of characteristics in order to form the cluster in the multiple network system.

8. The non-transitory physical storage media of claim 7 further comprising:
adding a node to the cluster if the node satisfies all demands in the description of characteristics.

9. The non-transitory physical storage media of claim 7 further comprising, eliminating a node from the node group as a candidate to be in the cluster if the node does not have a minimum amount of disk capacity.

10. The non-transitory physical storage media of claim 7 further comprising, eliminating a node from the node group as a candidate to be in the cluster if the node does not have a minimum amount of bandwidth capacity.

11. The non-transitory physical storage media of claim 7 further comprising: selecting, based on a bin packing problem, the nodes in the node group to use for virtual volumes in a disk array when an inter-node bandwidth is not uniform within the disk array.

12. The non-transitory physical storage media of claim 7, wherein the description of characteristics includes a list of specific networks and specific types of nodes that must form the cluster.

13. The non-transitory physical storage media of claim 7 further comprising, computing an intersection of cluster demands between the node group with groups of nodes in other networks referenced by the cluster demands.

14. The non-transitory physical storage media of claim 7 further comprising, determining to which networks nodes in the node group connect.

15. A computer, comprising:
a memory storing an algorithm; and
a processor executing the algorithm for:
receiving demand characteristics requested for nodes to form a cluster in a multi-network system that includes networks in storage clusters that form arrays and networks between the nodes and host computers;
collapsing groups of nodes in the multi-network system to form a node group;
comparing characteristics of nodes in the node group with the demand characteristics requested for the nodes to form the cluster in order to eliminate nodes from the node group;
selecting nodes in the node group that satisfy the demand characteristics in order to form the cluster in the multi-network system.

16. The computer of claim 15, the processor further executing the algorithm for:
designating one network in the multi-network system as a cluster interconnect;
requiring that a group of nodes has a minimum node count as an intersection with the cluster interconnect.

17. The computer of claim 15, the processor further executing the algorithm for:
evaluating disk capacity and bandwidth of nodes in the node group to determine which nodes to place in the cluster.

18. The computer of claim 15 the processor further executing the algorithm for:
applying weights to the demand characteristics;
ranking nodes in the node group after applying the weights.

19. The computer of claim 15, the processor further executing the algorithm for:
selecting, based on a bin packing problem, the nodes in the node group to use for virtual volumes in a disk array when an inter-node bandwidth is not uniform within the disk array.

20. The computer of claim 15, the processor further executing the algorithm for:
modifying by a user the demand characteristics to determine nodes to form the cluster.

* * * * *

UNITED STATES PATENT AND TRADEMARK OFFICE
CERTIFICATE OF CORRECTION

| | | |
|---|---|---|
| PATENT NO. | : 8,005,014 B2 | Page 1 of 1 |
| APPLICATION NO. | : 11/796419 | |
| DATED | : August 23, 2011 | |
| INVENTOR(S) | : Douglas L. Voigt et al. | |

It is certified that error appears in the above-identified patent and that said Letters Patent is hereby corrected as shown below:

In column 4, line 36, delete "Node:" and insert -- Node[n]: --, therefor.

In column 4, line 44, delete "GroupedNet:" and insert -- GroupedNet[p,b,g,n]: --, therefor.

In column 4, line 55, delete "Demand:" and insert -- Demand[d]: --, therefor.

In column 5, line 1, delete "Solution:" and insert -- Solution[s]: --, therefor.

Signed and Sealed this
Thirteenth Day of March, 2012

David J. Kappos
*Director of the United States Patent and Trademark Office*